(12) United States Patent
Chen et al.

(10) Patent No.: US 11,094,985 B2
(45) Date of Patent: Aug. 17, 2021

(54) SECONDARY BATTERY AND TOP COVER ASSEMBLY THEREOF

(71) Applicant: Contemporary Amperex Technology Co., Limited, Ningde (CN)

(72) Inventors: Xinxiang Chen, Ningde (CN); Chengyou Xing, Ningde (CN); Shoujun Huang, Ningde (CN); Yulian Zheng, Ningde (CN); Peng Wang, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 245 days.

(21) Appl. No.: 16/413,749

(22) Filed: May 16, 2019

(65) Prior Publication Data

US 2019/0355943 A1 Nov. 21, 2019

(30) Foreign Application Priority Data

May 18, 2018 (CN) .......................... 201820742555.7

(51) Int. Cl.
*H01M 50/147* (2021.01)
*H01M 50/543* (2021.01)
(Continued)

(52) U.S. Cl.
CPC ..... *H01M 50/147* (2021.01); *H01M 10/0525* (2013.01); *H01M 50/183* (2021.01);
(Continued)

(58) Field of Classification Search
CPC ............ H01M 2/04; H01M 2/26; H01M 2/08; H01M 2/34; H01M 2/12
See application file for complete search history.

(56) References Cited

U.S. PATENT DOCUMENTS

| 3,415,690 A | * | 12/1968 | Richman ............. H01M 2/1241 |
| | | | 429/56 |
| 2010/0227209 A1 | * | 9/2010 | Kim ...................... H01G 11/54 |
| | | | 429/94 |
| 2017/0047630 A1 | | 2/2017 | Cherng |

FOREIGN PATENT DOCUMENTS

| CN | 201956406 U | 8/2011 |
| FR | 2087323 A5 | 12/1971 |
| KR | 20050020036 A | 3/2005 |

OTHER PUBLICATIONS

European Search Report for EP19173491 dated Sep. 4, 2019 (7 pages).

* cited by examiner

*Primary Examiner* — Kenneth J Douyette
(74) *Attorney, Agent, or Firm* — Bejin Bieneman PLC

(57) ABSTRACT

The present disclosure provides a top cover assembly of a secondary battery. The top cover assembly includes: a top cover plate and a gas exhaust valve mounted in the top cover plate. The gas exhaust valve includes a valve body, a valve sleeve and a valve cover. The valve body includes a valve part, and the valve part is provided with a gas exhaust hole that communicates with an interior of the secondary battery. The valve cover seals and is connected to the valve body to form an accommodation space. The valve sleeve is located in the accommodation space, and the valve sleeve covers the valve part. A gas exhaust passage is disposed between the valve sleeve and the valve part, the valve cover is provided with a venting hole that communicates with outside, and the gas exhaust passage communicates with the gas exhaust hole and the venting hole.

8 Claims, 4 Drawing Sheets

(51) Int. Cl.
*H01M 50/578* (2021.01)
*H01M 10/0525* (2010.01)
*H01M 50/183* (2021.01)
*H01M 50/342* (2021.01)
*H01M 50/531* (2021.01)

(52) U.S. Cl.
CPC ....... *H01M 50/342* (2021.01); *H01M 50/531* (2021.01); *H01M 50/543* (2021.01); *H01M 50/578* (2021.01); *H01M 2200/20* (2013.01)

SECONDARY BATTERY AND TOP COVER ASSEMBLY THEREOF

CROSS-REFERENCE TO RELATED APPLICATIONS

[000.5] The present disclosure claims priority to Chinese Patent Application No. 201820742555.7, filed on May 18, 2018, the content of which is incorporated herein by reference in its entirety.

TECHNICAL FIELD

The present disclosure relates to the technical field of energy storage devices, and in particular, to a secondary battery and a top cover assembly thereof.

BACKGROUND

A secondary battery, such as a lithium-ion battery, produces gas during long-term use. Then, internal pressure of the battery would increase due to the gas production, thereby causing a case of the battery to bulge and deform. As a result, the battery performance decreases.

When gas inside the secondary battery reaches a certain pressure, it can be exhausted through e.g. a vent. However, the vent is a disposable component. That is, the battery will be destroyed once the battery performs exhausting through the vent. Therefore, the vent has a limited use. Moreover, the current vent cannot solve the problem of gas pressure increasing caused by slow gas production inside the secondary battery.

SUMMARY

There is a need for a technical solution, which can not only guarantee that the internal pressure does not excessively increase when gas is slowly produced inside the secondary battery, but also prevent excessive gas from being exhausted, which would otherwise cause the deformable plate not to be deformed, etc. In this way, the safety of the secondary battery can be improved.

The present disclosure provides a secondary battery and a top cover assembly thereof, aiming to meet the above requirements and improve safety of the secondary battery.

The present disclosure provides a top cover assembly of a secondary battery. The top cover assembly includes: a top cover plate; and a gas exhaust valve mounted in the top cover plate. The gas exhaust valve includes a valve body, a valve sleeve and a valve cover. The valve body includes a valve part. The valve part is provided with a gas exhaust hole that communicates with an interior of the secondary battery. The valve cover seals and is connected to the valve body to form an accommodation space. The valve sleeve is located in the accommodation space, and the valve sleeve covers the valve part. A gas exhaust passage is disposed between the valve sleeve and the valve part. The valve cover is provided with a venting hole that communicates with outside. The gas exhaust passage communicates with the gas exhaust hole and the venting hole.

In an embodiment, the valve sleeve is made of a deformable material, the valve sleeve is configured to deform under a force applied by gas exhausted from the gas exhaust hole so as to form the gas exhaust passage between the valve sleeve and the valve part, and the valve sleeve is configured to be in tight coupling with the valve part when the force applied by the gas is smaller than a force under which the valve sleeve begins to deform.

In an embodiment, the top cover plate is provided with a mounting hole in which the gas exhaust valve is mounted, the valve body is in tight coupling with an inner wall of the mounting hole, and a lower surface of the gas exhaust valve is coplanar with or above a lower surface of the top cover plate.

In an embodiment, the mounting hole further serves as a liquid injection hole via which an electrolyte is to be injected into the interior of the secondary battery.

In an embodiment, the venting hole is in a linear shape, and an orthographic projection of at least one end of the venting hole and an orthographic projection of the accommodation space have an overlapping area along a height direction of the secondary battery.

In an embodiment, the valve part is provided with a first groove, the first groove opening towards the valve sleeve and communicating with the gas exhaust hole.

In an embodiment, a lower surface of the valve part is provided with a second groove, and the gas exhaust hole is located in an area surrounded by an outline of the second groove.

In an embodiment, the valve sleeve comprises an anti-adhesion layer disposed on an inner wall of the valve sleeve forming the gas exhaust passage.

In an embodiment, the valve body comprises an annular recessed portion surrounding the valve part. The valve sleeve is structured as a hollow pillar with a top cover, the valve part is accommodated in the hollow pillar, and a sidewall of the valve sleeve is accommodated in the annular recessed portion.

The present disclosure further provides a secondary battery, including: an electrode assembly, a case, and the top cover assembly described above. The top cover assembly is connected at an opening of the case to form an encapsulation space, and the electrode assembly is encapsulated in the encapsulation space. The electrode assembly includes a first electrode plate, a second electrode plate and a separator disposed between the first electrode plate and the second electrode plate. The top cover assembly comprises a first electrode terminal electrically connected to the first electrode plate, and a second electrode terminal electrically connected to the second electrode plate.

It should be understood that the foregoing general description and the following detailed description are merely exemplary and are not intended to limit the present disclosure.

REFERENCE SIGNS

Figure 1:
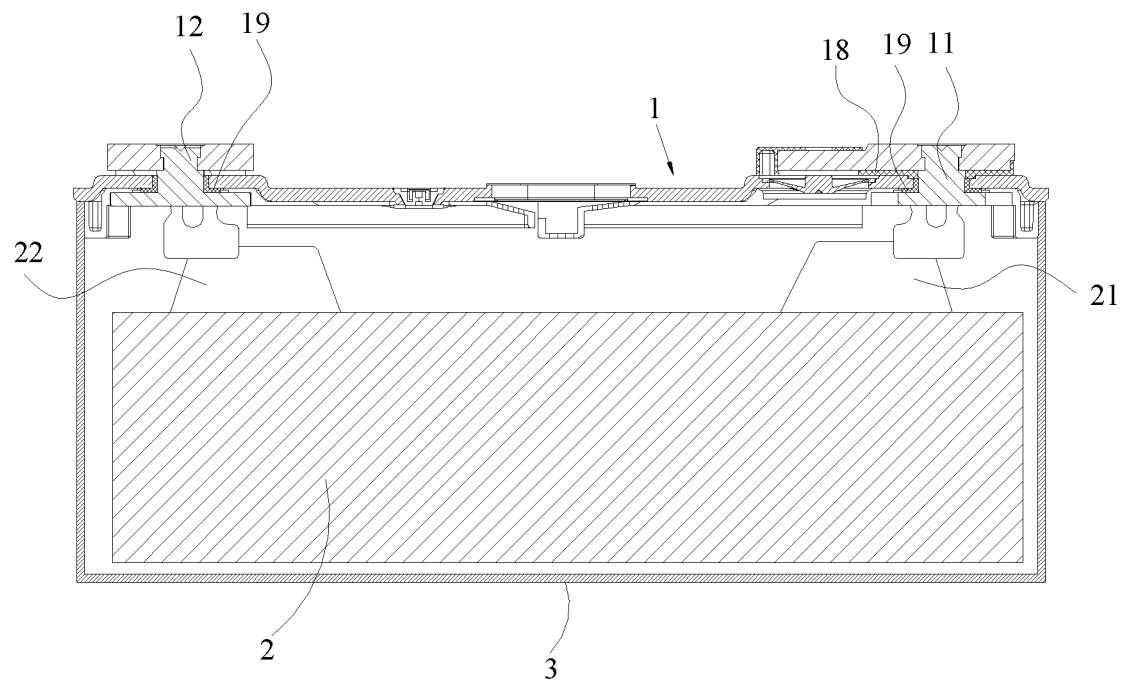
FIG. 1 is a cross-sectional view of a secondary battery according to an embodiment of the present disclosure.

1—top cover assembly;
11—first electrode terminal;
12—second electrode terminal;
13—top cover plate;
14—short circuit member;
  140—deformable plate;
  142—conductive plate;
15—vent;
16—gas exhaust valve;
  160—valve body;
    1600—valve part;
      16000—gas exhaust hole;
    1602—first groove;
    1604—second groove;
    1606—annular recessed portion;
    1608—groove;
  162—valve sleeve;
  164—valve cover;
    1640—venting hole;
18—insulating member;
19—seal ring;
2—electrode assembly;
21—first tab;
22—second tab;
3—case.

The drawings herein are incorporated into and constitute a part of the present specification, illustrate embodiments of the present disclosure and explain principles of the present disclosure together with the specification.

DESCRIPTION OF EMBODIMENTS

The present disclosure will be further described in details in the following with specific embodiments and with reference to the accompanying drawings.

It should be understood that, the terms such as "upper", "lower", "left", "right" and the like are used to indicate positions shown in the drawing, instead of being construed as limitations of the embodiment of the present disclosure. In addition, when an element is described as being "on" or "under" another element in the context, it should be understood that the element can be directly or via an intermediate element located "on" or "under" another element.

With reference to FIG. 1, the present disclosure provides a secondary battery. The secondary battery includes a secondary battery top cover assembly 1 (hereinafter referred to as a top cover assembly 1), an electrode assembly 2, and a case 3. The top cover assembly 1 seals and is connected to an opening of the case 3 to form an encapsulation space inside the case 3. The electrode assembly 2 is encapsulated in the encapsulation space.

The electrode assembly 2 includes a first electrode plate, a second electrode plate, and a separator located between the first electrode plate and the second electrode plate. The electrode assembly 2 may be formed by spirally winding the three. The electrode assembly 2 may also be formed by stacking multiple first electrode plates, multiple separators and multiple second electrode plates, which are in a form of a plate shape or a sheet shape.

The first electrode plate and the second electrode plate have different polarities. The first electrode plate includes a first coated area coated with an active material and a first tab 21 not coated with an active material. The second electrode plate includes a second coated area coated with an active material and a second tab 22 not coated with an active material. The top cover assembly 1 includes a first electrode terminal 11 and a second electrode terminal 12. The first tab 21 is connected to the first electrode terminal 11, and the second tab 22 is connected to the second electrode terminal 12, so as to achieve outputting of electric energy of the electrode assembly 2.

Figure 2:
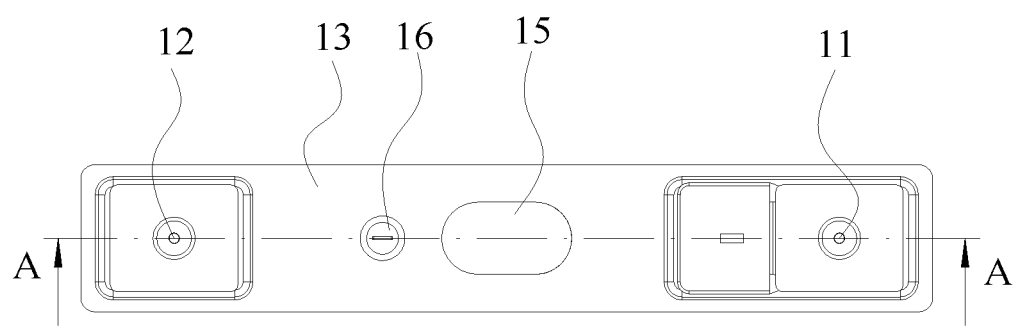
FIG. 2 is a top view of a top cover assembly of a secondary battery according to an embodiment of the present disclosure.
Figure 3:
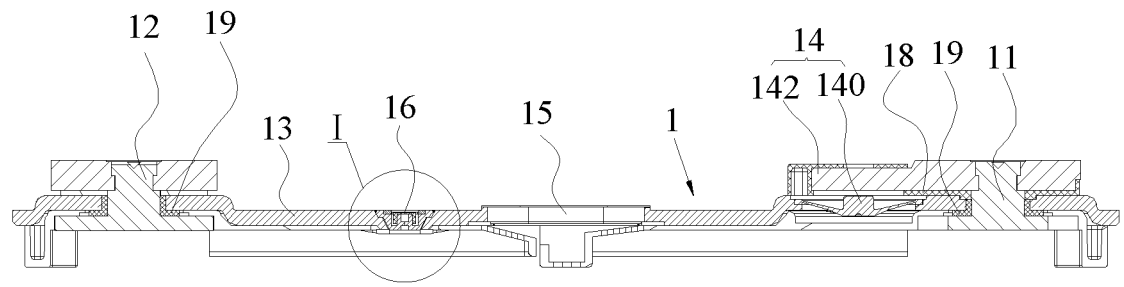
FIG. 3 is a schematic view along A-A of FIG. 2.

With reference to FIG. 2 and FIG. 3, the top cover assembly 1 further includes a top cover plate 13. The top cover assembly 1 seals and is connected to the case 3 via the top cover plate 13, for example, by welding. Further, the top cover plate 13 serves as a base of the top cover assembly 1 to provide a mounting carrier for other components of the top cover assembly 1, such as the first electrode terminal 11, the second electrode terminal 12, a short circuit member 14 or the like.

The short circuit member 14 can improve safety of the secondary battery when the secondary battery is overcharged. In an embodiment shown in FIG. 3, the short circuit member 14 includes a deformable plate 140 and a conductive plate 142. The deformable plate 140 is connected to the top cover plate 13. The top cover plate 13 is insulated from the first electrode terminal 11 and electrically connected to the second electrode terminal 12. The conductive plate 142 is connected to the first electrode terminal 11. When the internal pressure of the secondary battery reaches a deforming pressure of the deformable plate 140, the deformable plate 140 deforms to get into contact with the conductive plate 142. At this time, an external short circuit is formed for the secondary battery, and in this short circuit, a large short-circuit current fuses a fuse member connected in the circuit. That is, the overcharge of the secondary battery is stopped.

In addition, the top cover assembly 1 further includes a vent 15. The vent 15 may open when the internal pressure of the secondary battery reaches its opening pressure, thereby reducing a risk of explosion occurring in the secondary battery. The opening pressure of the vent 15 can be larger than the deforming pressure of the deformable plate 140.

The short circuit member 14 and the vent 15 described above can improve the safety of the secondary battery, but neither of them can solve the problem of gas exhausting when gas is slowly produced inside the secondary battery under a normal operating condition. Therefore, the present disclosure provides a solution which can solve the problem of gas exhausting described above without causing failure of the deformable plate 140 and the vent 15.

Figure 4:
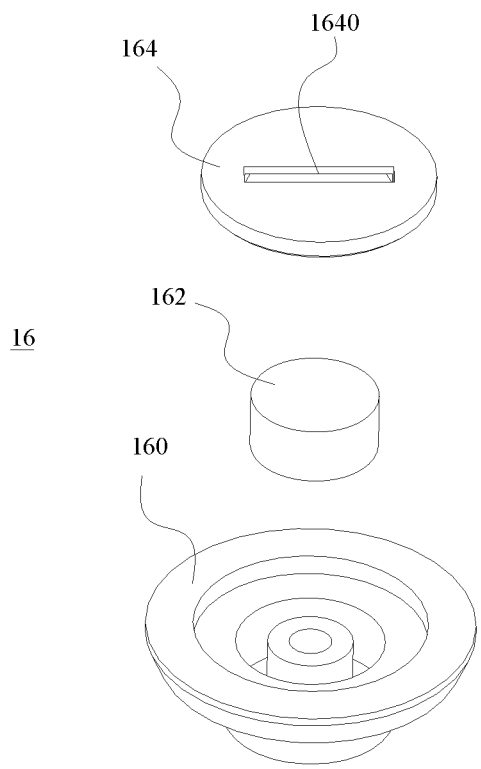
FIG. 4 is an exploded view of a gas exhaust valve of a top cover assembly of a secondary battery according to an embodiment of the present disclosure.
Figure 5:
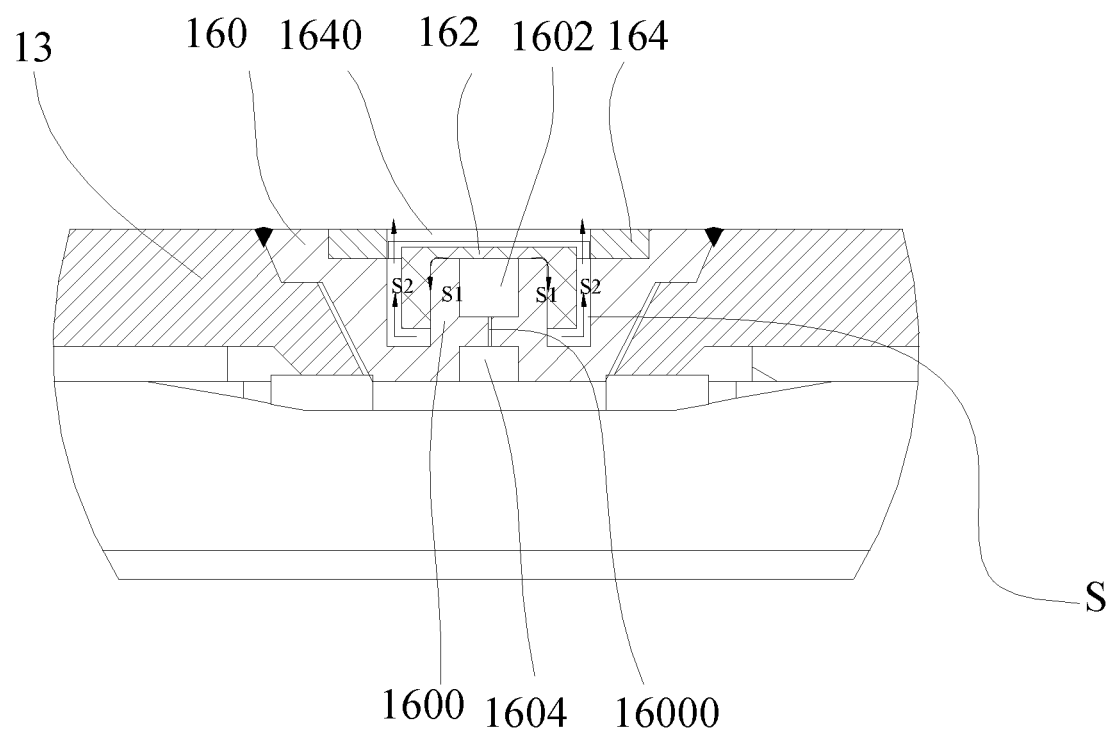
FIG. 5 is an enlarged view of portion I of FIG. 3.

With reference to FIG. 4 and FIG. 5, the secondary battery further includes a gas exhaust valve 16. The gas exhaust valve 16 includes a valve body 160, a valve sleeve 162 and a valve cover 164. The valve body 160 is mounted in a mounting hole of the top cover plate 13 and is in tight coupling with the top cover plate 13. The valve body 160 includes a valve part 1600, and the valve part 1600 is provided with a gas exhaust hole 16000 that communicates with an interior of the secondary battery, that is, gas generated inside the secondary battery can enter the gas exhaust hole 16000.

The valve cover 164 is sealed and connected to the valve body 160, for example, by welding. The valve cover 164 and the valve body 160 enclose an accommodation space S. The valve sleeve 162 is accommodated in the accommodation space S and covers the valve part 1600. The valve sleeve 162 is structured as a hollow pillar with a top cover. The valve part 1600 is disposed inside the hollow pillar. Accordingly, the gas exhaust hole 16000 is also disposed inside the hollow pillar of the valve sleeve 162.

The valve cover 164 is provided with a venting hole 1640, and the venting hole 1640 communicates with the accommodation space S. Moreover, a gas exhaust passage is arranged between the valve sleeve 162 and the valve part 1600. The gas exhaust passage communicates with the gas exhaust hole 16000 and the venting hole 1640, respectively. It should be noted that a part of the accommodation space S also serves as a gas exhaust passage, and the accommodation space S communicates with the gas exhaust passage.

In an embodiment, the valve sleeve 162 can be made of a deformable material, such as fluoroelastomer or ethylene propylene rubber. In this case, the gas exhaust passage between the valve part 1600 and the valve sleeve 162 can be formed by deformation of the valve sleeve 162. Specifically, the valve sleeve 162 may cover the valve part 1600 by means of interference fit. When the gas exhausted from the gas exhaust hole 16000 acts on the valve sleeve 162, the valve sleeve 162 deforms towards a direction away from the valve part 1600 under a force. In this case, a gap is formed between the valve sleeve 162 and the valve part 1600, and this gap is a gas exhaust passage.

When an applied force of the gas is smaller than a force under which the valve sleeve 162 deforms, the valve sleeve 162 is restored from deformation. In this case, the valve sleeve 162 and the valve part 1600 are restored to interference fit and tight coupling, thereby preventing impurities from entering the interior of the battery. This can achieve one-way gas exhausting in a direction and sealing in an opposite direction.

It should be understood that in the above embodiments, a critical pressure under which the valve sleeve 162 deforms can be changed by adjusting an elasticity modulus of the valve sleeve 162.

Optionally, in other embodiments, the gas exhaust passage may also be formed in a gap reserved between the valve sleeve 162 and the valve part 1600. Meanwhile, in order to prevent external impurities, the valve sleeve 162 and the valve part 1600 can adopt a labyrinth sealing structure, which can also achieve one-way gas exhausting in a direction and sealing in an opposite direction.

When gas is slowly produced inside the secondary battery, the gas may enter the gas exhaust passage via the gas exhaust hole 16000 and then be exhausted to outside the secondary battery through the gas exhaust passage. It should be noted that a size of the gas exhaust hole 16000 can be determined according to a gas exhausting rate thereof. For example, the gas exhausting rate of the gas exhaust hole 16000 may be set to be smaller than $\frac{1}{10}$ of a gas production rate inside the secondary battery. In this way, the internal pressure of the secondary battery resulting from slow gas production then can be reduced without affecting normal deformation of the deformable plate 140 and normal opening of the vent 15. Therefore, the safety of the secondary battery can be improved. Herein, the gas exhaust hole 16000 can be formed by means of laser processing.

When being exhausted, the gas passes the gas exhaust passage (arrow S1 in FIG. 5) and a partial space of the accommodation space S (arrow S2 in FIG. 5). Herein, the S1 section is a gap formed between the valve part 1600 and the deformed valve sleeve 162, and the S2 section is a gap reserved between an outer wall of the valve sleeve 162 and an inner wall of the valve body 160 in the accommodation space S.

In order to avoid adhesion between the valve sleeve 162 and the valve part 1600 during the gas exhausting process, an anti-adhesion layer may be provided on the valve sleeve 162. For example, the anti-adhesion layer may be formed by coating with a teflon material, thereby avoiding blockage of the gas exhaust passage. Of course, the anti-adhesion layer can be formed by other materials.

In an embodiment, an anti-adhesion layer may be provided on only a portion of the inner wall of the valve sleeve 162 that is formed as the gas exhaust passage. However, for ease of coating, the valve sleeve 162 may also be entirely coated, to which the present disclosure is not limited.

With further reference to FIG. 5, in the mounting hole of the top cover plate 13, the valve body 160 is in tight coupling with the inner wall of the mounting hole, and the valve sleeve 162 and the valve cover 164 are sequentially mounted to the valve body 160. A lower surface of the valve body 160 is a bottom surface of the gas exhaust valve 16.

In an example, the lower surface of the valve body 160 may not go beyond the lower surface of the top cover plate 13, so that the valve body 160 may not occupy space inside the secondary battery. Accordingly, the electrode assembly 2 may be selected to have a larger size. In this way, the energy density of the secondary battery can be increased.

Further, an upper surface of the gas exhaust valve 16 may not go beyond an upper surface of the top cover plate 13, so that the gas exhaust valve 16 can be prevented from interfering with external objects. In this way, the gas exhaust valve 16 is completely accommodated inside the mounting hole, thereby improving structural compactness of the top cover assembly 1.

Usually, the top cover plate 13 is further provided with a liquid injection hole. The electrolyte may be injected from the liquid injection hole into the encapsulation space sealed by the top cover plate 13 and the case 3, so as to get into full contact with the electrode assembly 2. In the present disclosure, in order to reduce a number of holes arranged in the top cover plate 13 while avoiding severely weakening of the strength of the top cover plate 13, the liquid injection hole may share one hole with the mounting hole. That is, the electrolyte is injected from the mounting hole, and the mounting hole is sealed by the gas exhaust valve 16. In this case, the gas exhaust valve 16 also functions as a seal nail.

As shown in FIG. 5, a first groove 1602 is provided in the valve part 1600. The first groove 1602 faces towards the valve sleeve 162 and communicates with the gas exhaust hole 16000. With such arrangement, the gas exhausted from the gas exhaust hole 16000 may gradually gather inside the first groove 1602, and the arrangement of the first groove 1602 may increase the contact area between the gas and the valve sleeve 162. Therefore, when the gas pressure acts on the valve sleeve 162, the valve sleeve 162 has a larger deformed area, thereby allowing the valve sleeve 162 to deform more easily so as to form a more reliable gas exhaust passage.

Further, a second groove 1604 is provided on the lower surface of the valve body 160, and the gas exhaust hole 16000 is disposed in an area surrounded by an outline of the second groove 1604. With such arrangement, a groove wall of the second groove 1604 can protect the gas exhaust hole 16000, so that the electrolyte impurities and other contaminants can be prevented from entering and blocking the gas exhaust hole 16000. This can allow gas inside the secondary battery to enter the gas exhaust hole 16000 smoothly.

With further reference to FIG. 4, the venting hole 1640 may be formed in a linear shape. Optionally, along a height direction of the secondary battery, an orthographic projection of at least one end of the venting hole 1640 and an orthographic projection of the accommodation space have an overlapping area. In this way, the venting hole 1640 can directly communicate with the accommodation space, resulting in a smaller resistance against gas exhausting.

In addition, in order to further reduce risk of external impurities entering the interior of the secondary battery, the venting hole 1640 may have a smaller size, as long as the gas can be smoothly exhausted. For example, for a venting hole 1640 in a linear shape, its width may be smaller than 1 mm. It should be noted that, the venting hole 1640 may have other shapes and sizes, and the present disclosure is not limited herein.

Figure 6:
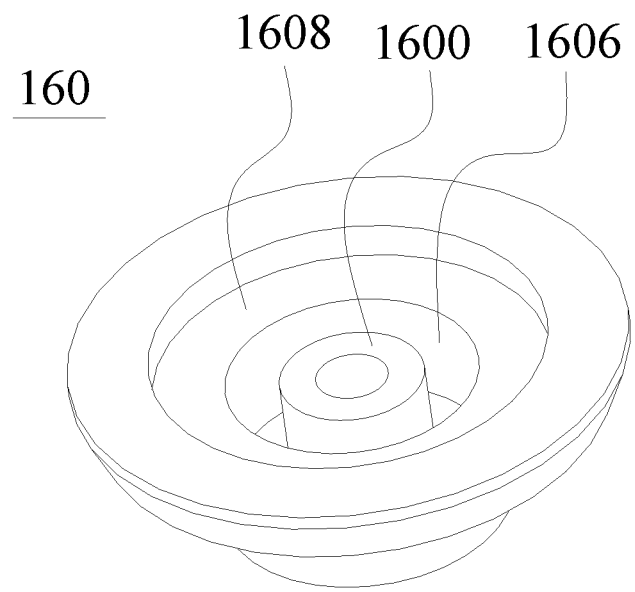
FIG. 6 is a schematic diagram of a valve body of a gas exhaust valve according to an embodiment of the present disclosure.
Figure 7:
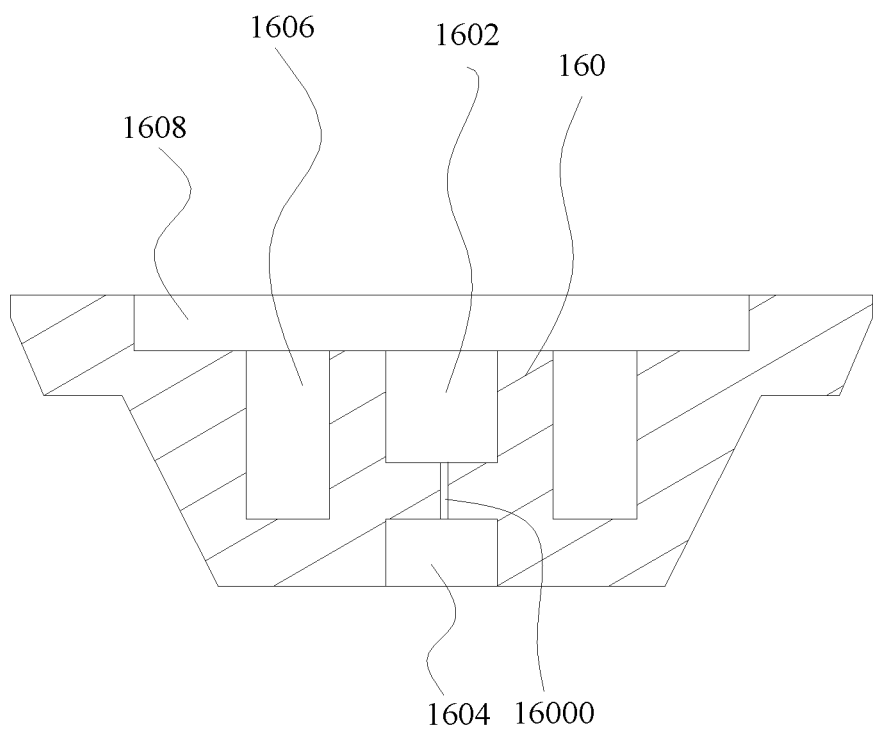
FIG. 7 is a cross-sectional view of a valve body of a gas exhaust valve according to an embodiment of the present disclosure.

With reference to FIG. 6 and FIG. 7, the valve body 160 includes an annular recessed portion 1606. The annular recessed portion 1606 surrounds the valve part 1600. The valve sleeve 162 covers the valve part 1600, and a sidewall of the valve sleeve 162 is accommodated in the annular recessed portion 1606. With the structure described above, a mounting height of the valve sleeve 162 when being mounted to the valve body 160 can be reduced, thereby resulting in a more compact structure for the gas exhaust valve 16.

In addition, the valve body 160 further includes a groove 1608. The groove 1608 communicates with the annular recessed portion 1606. The valve cover 164 is accommodated in the groove 1608, and the upper surface of the valve cover 164 does not go beyond the upper surface of the valve body 160.

With further reference to FIG. 1, the top cover assembly 1 further includes an insulating member 18. The insulating member 18 is disposed on the upper surface of the top cover plate 13 so as to insulate the conductive plate 142 from the top cover plate 13. The insulating member 18 may be attached to the upper surface of the top cover plate 13 by injection molding, but the present disclosure is not limited herein.

The top cover assembly 1 further includes seal rings 19. Each of the first electrode terminal 11 and the second electrode terminal 12 is sleeved by a seal ring 19. The seal ring 19 is located between the first electrode terminal 11 and the top cover plate 13, and is in tight coupling with both of them. The seal ring 19 is located between the second electrode terminal 12 and the top cover plate 13, and is in tight coupling with both of them. The first electrode terminal 11 and the second electrode terminal 12 extend from hollow parts of respective seal rings 19 to outside the top cover plate 13.

The above-described embodiments are merely preferred embodiments of the present disclosure and are not intended to limit the present disclosure. Various modifications and changes may be made to the present disclosure by those skilled in the art. However, any modifications, equivalent substitutions and improvements made within the principle of the present disclosure shall fall into the protection scope of the present disclosure.

What is claimed is:

1. A top cover assembly of a secondary battery, the top cover assembly comprising:
   a top cover plate; and
   a gas exhaust valve mounted in the top cover plate,
   wherein the gas exhaust valve comprises a valve body, a valve sleeve and a valve cover; the valve body comprises a valve part, and the valve part is provided with a gas exhaust hole that communicates with an interior of the secondary battery;
   wherein the valve cover seals and is connected to the valve body to form an accommodation space, the valve sleeve is located in the accommodation space, and the valve sleeve covers the valve part; a gas exhaust passage is disposed between the valve sleeve and the valve part, the valve cover is provided with a venting hole that communicates with outside, and the gas exhaust passage communicates with the gas exhaust hole and the venting hole;
   wherein the valve part is provided with a first groove opening towards the valve sleeve and communicating with the gas exhaust hole, a lower surface of the valve part is provided with a second groove, and the gas exhaust hole is located in an area surrounded by an outline of the second groove and in communication with the second groove, in such a manner that the gas exhaust hole is disposed between the first groove and the second groove; and
   wherein the valve body includes an annular recessed portion surrounding the valve part, the valve sleeve is structured as a hollow pillar with a top cover, the valve part is accommodated in the hollow pillar, and a sidewall of the valve sleeve is accommodated in the annular recessed portion.

2. The top cover assembly according to claim 1, wherein the valve sleeve is made of a deformable material, the valve sleeve is configured to deform under a force applied by gas exhausted from the gas exhaust hole so as to form the gas exhaust passage between the valve sleeve and the valve part, and the valve sleeve is configured to be in tight coupling with the valve part when the force applied by the gas is smaller than a force under which the valve sleeve begins to deform.

3. The top cover assembly according to claim 1, wherein the top cover plate is provided with a mounting hole in which the gas exhaust valve is mounted, the valve body is in tight coupling with an inner wall of the mounting hole, and a lower surface of the gas exhaust valve is coplanar with or above a lower surface of the top cover plate.

4. The top cover assembly according to claim 3, wherein the mounting hole further serves as a liquid injection hole via which an electrolyte is to be injected into the interior of the secondary battery.

5. The top cover assembly according to claim 1, wherein the venting hole is in a linear shape, and an orthographic projection of at least one end of the venting hole and an orthographic projection of the accommodation space have an overlapping area along a height direction of the secondary battery.

6. The top cover assembly according to claim 1, wherein the valve sleeve comprises an anti-adhesion layer disposed on an inner wall of the valve sleeve forming the gas exhaust passage.

7. The top cover assembly according to claim 1, wherein the top cover seals a side of the hollow pillar.

8. A secondary battery, comprising an electrode assembly, a case and the top cover assembly according to claim 1,
   wherein the top cover assembly is connected at an opening of the case to form an encapsulation space, and the electrode assembly is encapsulated in the encapsulation space,
   the electrode assembly comprises a first electrode plate, a second electrode plate and a separator disposed between the first electrode plate and the second electrode plate; and the top cover assembly comprises a first electrode terminal electrically connected to the first electrode plate, and a second electrode terminal electrically connected to the second electrode plate.

* * * * *